United States Patent [19]

Andersen et al.

[11] 4,312,410
[45] Jan. 26, 1982

[54] ROTARY EARTH CRUMBLING IMPLEMENT

[75] Inventors: Helge H. Andersen; Mathias Andersen, both of Soro; Finn Jensen, Vemmelev, all of Denmark

[73] Assignee: Kongskilde Koncernselskab A/S, Denmark

[21] Appl. No.: 112,445

[22] Filed: Dec. 27, 1979

[30] Foreign Application Priority Data

Aug. 7, 1979 [DK] Denmark .............................. 3311/79

[51] Int. Cl.³ ............................................. A01B 27/00
[52] U.S. Cl. ........................................ 172/552; 301/74
[58] Field of Search ................ 172/68, 121, 556, 543, 172/552, 553; 301/74, 80; 29/159.03, 159.02

[56] References Cited

U.S. PATENT DOCUMENTS

| | | | |
|---|---|---|---|
| 324,952 | 8/1885 | Mustard | 301/74 |
| 876,334 | 1/1908 | Cooper | 301/80 |
| 1,244,982 | 10/1917 | Horst | 172/543 |
| 2,559,232 | 7/1951 | Simon | 172/556 |
| 2,909,888 | 10/1959 | Lely | 172/548 |
| 4,043,400 | 8/1977 | Lely | 172/59 |

*Primary Examiner*—Richard J. Johnson
*Attorney, Agent, or Firm*—O'Brien & Marks

[57] ABSTRACT

In a rotary earth crumbler having a central shaft (1) with mounting discs (2) fast thereon and an annular series of U-shaped resilient stirrups (3), the leg portions of these stirrups are formed with an outwardly convex curved section (12) which extends into a fixing slot (11) in the mounting disc and is then locked therein by deformation of parts of the slot borders below the mid portion of the curved section, thereby narrowing said slot. The locking may easily be released when needed, viz. by bringing the slot borders back to the original shape.

3 Claims, 3 Drawing Figures

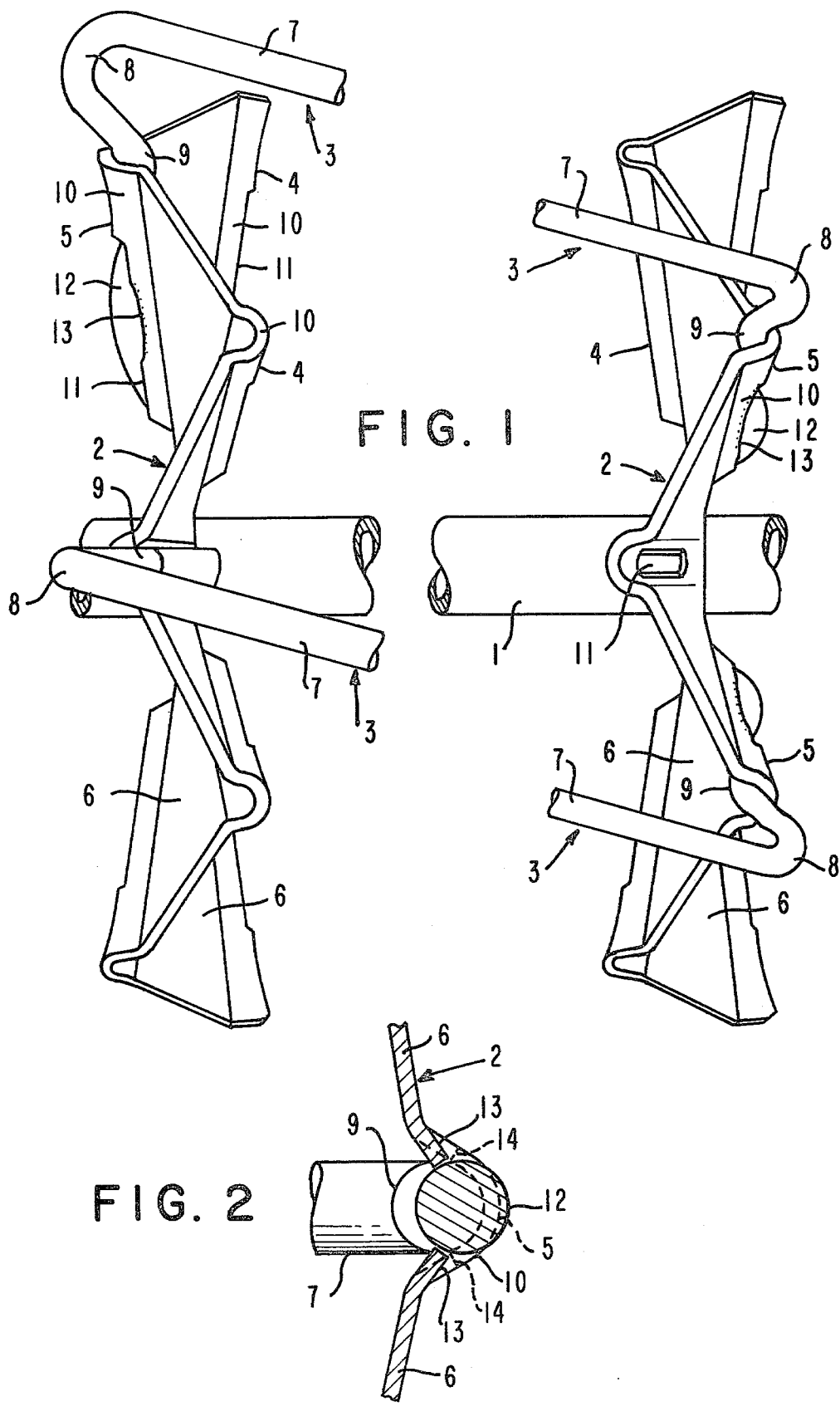

ROTARY EARTH CRUMBLING IMPLEMENT

For the purpose of obtaining a particularly smooth field surface, e.g. after harrowing or sowing, different drum shaped implements have been suggested which operate to smooth out shallow furrows and to crumble any earth clods.

This invention relates to such an implement, known as a rotary crumbler, which comprises a plurality of annular units composed of substantially U-shaped resilient stirrups of rod material, the body or central portions of which lie substantially in a cylindrical surface around a carrier shaft, and the leg portions being directed towards this shaft and being releasably secured in mounting discs fixed to the shaft.

Normally, an implement of this type includes several stirrup units, e.g. 6 to 8 in number, on a common shaft and so arranged that adjacent units overlap to some extent, and with a view to achieving a smooth rolling movement it is preferred that the active body or central portions of the stirrups, rather than being parallel to the shaft, are helically offset in the cylindrical surface, i.e. cross their axis of rotation under a suitable angle, say 10° to 15°, and are curved slightly outwardly between their ends which merge into their legs.

As stated, the stirrups should be releasable because replacement may occasionally be necessary due to damage or wear. In this respect it has been attempted to hold the stirrups in place solely by their inherent elasticity, viz. by inserting the stirrups under tension between a pair of associated mounting discs, but the result obtained in this way did not satisfy the expectations. This depends, at least in part, on the fact that when in use the stirrups lose to some degree their initial elasticity and, therefore, tend to become loose and possibly come off the implement during its use. This can be prevented by a positive clamping of the resilient stirrups to the mounting discs, e.g. by means of U-shaped bolts with associated nuts and locking washers, but this involves a rather substantial increase of cost, and after some time it may prove difficult to replace a stirrup because the nuts are rusted fast.

Through the invention it is attempted to provide a stirrup mounting which is cheap to establish and reliable in operation and at the same time permits an easy replacement of the resilient stirrups, when needed.

Thus, according to the invention, each stirrup leg includes an outwardly convex curved section which extends into and partly through a substantially radial slot in the associated mounting disc, said slot having an initial width corresponding to the thickness of the rod material but, by deformation of the disc material after the insertion of the curved leg section therein, being narrowed at its mid portion for locking said curved leg portion in place.

By this arrangement the resilience of the stirrups may be utilized to temporarily secure the stirrups in their correct positions, it being possible to squeeze the stirrup legs sufficiently together against the resilience, particularly in the body or central stirrup portion, to permit the outwardly convex curved sections to be inserted between the associated mounting discs so as to snap into the slots provided in these discs. The dimensions and the nature of the material, from which the stirrups are made, could be so adapted that the fixation of the stirrups obtained in this way would be sufficient to keep the implement intact while working under ideal conditions, e.g. in easily crumbled soil without any stones but, in particular, the extra locking obtained by the narrowing of the slots must be considered necessary, such narrowing positively preventing the curved sections from leaving the slots. The discs may be prepared for the narrowing of the slots in the way that the edge portions of the slots are provided with deformable obstruction parts which, subsequent to the temporary mounting of the stirrups, are brought into their operative position, as by hammer strokes, and just as easy may be brought back into their initial non-locking position when it is desired to loosen the stirrup.

A preferred embodiment of the rotary crumbler according to the invention will now be more fully described with reference to the drawing in which FIG. 1 illustrates a single section or annular stirrup unit with certain parts broken away. FIG. 2 is a cross sectional view taken along the line 2—2 in FIG. 1.

The section or unit shown on the drawing comprises a tubular shaft 1 the ends of which (not shown) may be journalled, in a conventional manner, in a frame or chassis to be coupled directly or indirectly to a tractor, and two mounting discs 2 fast on the shaft as well as six resilient stirrups 3 of which, however, only two are shown on the drawing.

The mounting discs 2 are circumferentially corrugated with radially extending crests 4 facing towards the centre of the section and alternating with troughs 5. In the embodiment shown the areas 6 between the crests and the troughs are flat and include an angle which is preferably about 160°. The troughs 5 serve to receive the resilient stirrups 3 which include a straight or slightly outwardly convex body portion 7 merging smoothly, as at 8, into leg portions 9 directed towards the shaft 1. When the body portions 7 follow helical lines, as shown, the leg portions 9 should preferably be twisted into their radial position before the mounting of the stirrups.

In order to enhance the gripping effect, the troughs 5 are shaped with extra depressions or channels 10 which fit partly around the leg portions 9 of the stirrups and have bottom slots 11 having initially a width similar to the thickness of the rod material of the stirrups 3. These slots serve to receive outwardly convex curved sections 12 of the leg portions 9 which after having been inserted in the slots are firmly secured to the discs 2 by narrowing the slots at the mid portion of the curved sections. This narrowing is obtained, as shown in FIG. 2, by deformation, as by pressing or hammer strokes, of the disc material which in the depressions 10 borders the slots and, thus, forms protruding deformable edge portions 13. The final deformed positions of the edge portions 13 are shown by solid lines in FIG. 2, while the initial undeformed positions are shown by broken lines 14.

It will be evident that the crests 4 referred to in the foregoing may serve as troughs for the stirrups of two adjacent sections or units and, therefore, have shape details similar to those of the troughs 5.

We claim:

1. A rotary earth crumbling implement having a plurality of annular units, each of said units comprising
   a carrier shaft section;
   a pair of spaced mounting discs fixed to the shaft section, each of said mounting discs having a plurality of substantially radial channels having slots formed in the bottoms thereof; said discs having deformable edge portions bordering the slots;

a plurality of separate substantially U-shaped resilient stirrups of rod material releasably secured to said discs, each of said stirrups having a body portion which lies substantially in a cylindrical surface around said shaft section between said discs and a pair of radially inwardly extending legs partially within the corresponding channels of the respective discs; and, wherein each of said legs includes a convex section spaced radially outward from the inner end of the leg and which extends into and partly through a respective one of said slots in a respective one of said mounting discs, said slots being narrowed by deformation of the deformable edge portions after the insertion of the convex leg sections therein for locking said convex leg sections in place.

2. A rotary implement as claimed in claim 1, wherein the mounting discs are corrugated with radially extending crests and troughs, said channels and slots lying in the troughs.

3. A rotary implement as claimed in claim 2 wherein the crests of the mounting discs serve as troughs for the stirrups of an adjacent annular unit.

* * * * *